United States Patent
Hein et al.

(10) Patent No.: US 11,981,417 B2
(45) Date of Patent: May 14, 2024

(54) PANEL SKIN FOR HEATED FLOOR PANELS

(71) Applicant: GOODRICH CORPORATION, Charlotte, NC (US)

(72) Inventors: Brandon Hein, Stow, OH (US); James A Mullen, Wadsworth, OH (US); George F. Owens, Akron, OH (US); Nathaniel Ching, Hartville, OH (US); Jin Hu, Hudson, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 306 days.

(21) Appl. No.: 16/824,984

(22) Filed: Mar. 20, 2020

(65) Prior Publication Data

US 2021/0291957 A1 Sep. 23, 2021

(51) Int. Cl.
| | | |
|---|---|---|
| *B64C 1/18* | (2006.01) | |
| *B32B 3/12* | (2006.01) | |
| *B32B 15/04* | (2006.01) | |
| *B32B 27/02* | (2006.01) | |
| *B32B 27/06* | (2006.01) | |
| *B32B 37/14* | (2006.01) | |

(52) U.S. Cl.
CPC .................. *B64C 1/18* (2013.01); *B32B 3/12* (2013.01); *B32B 15/04* (2013.01); *B32B 27/02* (2013.01); *B32B 27/06* (2013.01); *B32B 37/146* (2013.01); *B32B 2262/0269* (2013.01); *B32B 2305/024* (2013.01); *B32B 2419/04* (2013.01); *B32B 2605/18* (2013.01); *Y10T 428/2419* (2015.01)

(58) Field of Classification Search
CPC .............. B32B 2419/04; B32B 37/146; B32B 2305/024; B64C 1/18; F24D 13/02; F24D 3/12; F24D 3/16; F24D 3/14; F24D 3/147; F24D 13/024
See application file for complete search history.

(56) References Cited

U.S. PATENT DOCUMENTS

| | | | |
|---|---|---|---|
| 3,697,728 A | * | 10/1972 | Stirzenbecher ........ B64D 13/08 219/466.1 |
| 8,834,667 B2 | | 9/2014 | McCarville et al. |
| 10,399,285 B2 | | 9/2019 | Carlson et al. |

(Continued)

FOREIGN PATENT DOCUMENTS

| | | |
|---|---|---|
| DE | 102009052535 | 5/2011 |
| JP | 2010223496 A * | 10/2010 |

(Continued)

OTHER PUBLICATIONS

European Patent Office, European Search Report dated Jul. 28, 2021 in Application No. 21163796.2.

(Continued)

*Primary Examiner* — Alicia J Weydemeyer
(74) *Attorney, Agent, or Firm* — SNELL & WILMER L.L.P.

(57) ABSTRACT

A heated floor panel may comprise a base assembly and a heating element located on a first surface of the base assembly. A panel skin may be located over the heating element and the first surface of the base assembly. The panel skin may extend from the first surface of the base assembly to a second surface of the base assembly opposite the first surface of the base assembly.

9 Claims, 4 Drawing Sheets

(56) References Cited

U.S. PATENT DOCUMENTS

| | | |
|---|---|---|
| 2008/0210679 A1 | 9/2008 | Raidt et al. |
| 2010/0043955 A1 | 2/2010 | Hornick et al. |
| 2012/0040135 A1* | 2/2012 | Werthen .................... B32B 7/12 |
| | | 428/189 |
| 2012/0285947 A1* | 11/2012 | Bauer .................... H05B 6/105 |
| | | 219/635 |
| 2015/0053662 A1 | 2/2015 | Hu et al. |
| 2016/0270152 A1 | 9/2016 | Duce et al. |
| 2018/0162039 A1 | 6/2018 | Cloud et al. |
| 2019/0135442 A1 | 5/2019 | Seidler et al. |

FOREIGN PATENT DOCUMENTS

| | | | |
|---|---|---|---|
| WO | WO-0068527 A1 * | 11/2000 | ............. B27N 3/143 |
| WO | WO-2010137800 A2 * | 12/2010 | ........... F24D 13/022 |

OTHER PUBLICATIONS

European Patent Office, European Office Action dated Jan. 19, 2023 in Application No. 21163796.2.

* cited by examiner

PANEL SKIN FOR HEATED FLOOR PANELS

FIELD

The present disclosure relates generally to aircraft floor panels, and more specifically, to panel skins for heated floor panels.

BACKGROUND

Heated floor panels for aircraft generally comprise a heating element located between a structural base and a metallic skin. These floor panels may be susceptive to edge damage and/or separation of the metallic skin from the panel, particularly during installation and repair, when the floor panel may be accidentally dropped and/or hit against other objects. Some current heated floor panels include a filler material around the edge of the panel for protection; however, the filler material adds weight to the panel and may not be robust enough to withstand the harsh environment and handling to which the panels are subjected.

SUMMARY

A heated floor panel is disclosed herein. In accordance with various embodiments, the heated floor panel may comprise a base assembly, a heating element located on a first surface of the base assembly and a panel skin located over the heating element and the first surface of the base assembly. The panel skin may extend from the first surface of the base assembly to a second surface of the base assembly, the second surface of the base assembly being opposite the first surface of the base assembly.

In various embodiments, the base assembly may comprise a top layer, a bottom layer, and a honeycomb layer. The honeycomb layer may be located between the top layer and the bottom layer. In various embodiments, the panel skin may surround an outer perimeter of the honeycomb layer.

In various embodiments, the panel skin may comprise at least one of a metal, a metal alloy, a polymer, or a composite material. In various embodiments, the panel skin may comprise an aramid fiber.

In various embodiments, the panel skin may define a cavity configured to receive the base assembly. In various embodiments, the panel skin may be directly adjacent to the outer perimeter of the honeycomb layer.

A heated floor panel, in accordance with various embodiments, may comprise a heating element, a panel skin located over the heating element, and a base assembly located in a cavity defined by the panel skin.

In various embodiments, the base assembly may include a first surface, a second surface opposite the first surface, and a plurality of sidewalls extending between the first surface and the second surface.

In various embodiments, the panel skin may be located on the first surface of the base assembly. In various embodiments, the panel skin may extend to the second surface of the base assembly.

In various embodiments, the base assembly may include a first layer comprising the first surface, a second layer comprising the second surface, and a honeycomb layer located between the first layer and the second layer. In various embodiments, the panel skin may surround an outer perimeter of the honeycomb layer.

In various embodiments, the first layer and the second layer of the base assembly may each comprise a fiber reinforced composite material. In various embodiments, the panel skin may comprise a metal, a metal alloy, a polymer, or a fiber reinforced composite material. In various embodiments, the panel skin may comprise an aramid fiber.

A method of forming a heated floor panel is also disclosed herein. In accordance with various embodiments, the method may comprise the steps of forming a panel skin including a cavity and bonding the panel skin to a base assembly. The base assembly may include a heating element, and the base assembly may be located within the cavity of the panel skin.

In various embodiments, the method may further comprise forming the base assembly and locating the base assembly in the cavity after forming the base assembly. In various embodiments, the method may further comprise curing the base assembly prior to bonding the panel skin to the base assembly.

In various embodiments, the method may further comprise curing the base assembly during the step of boding the panel skin to the base assembly.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching and surface shading lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

Figure 1:
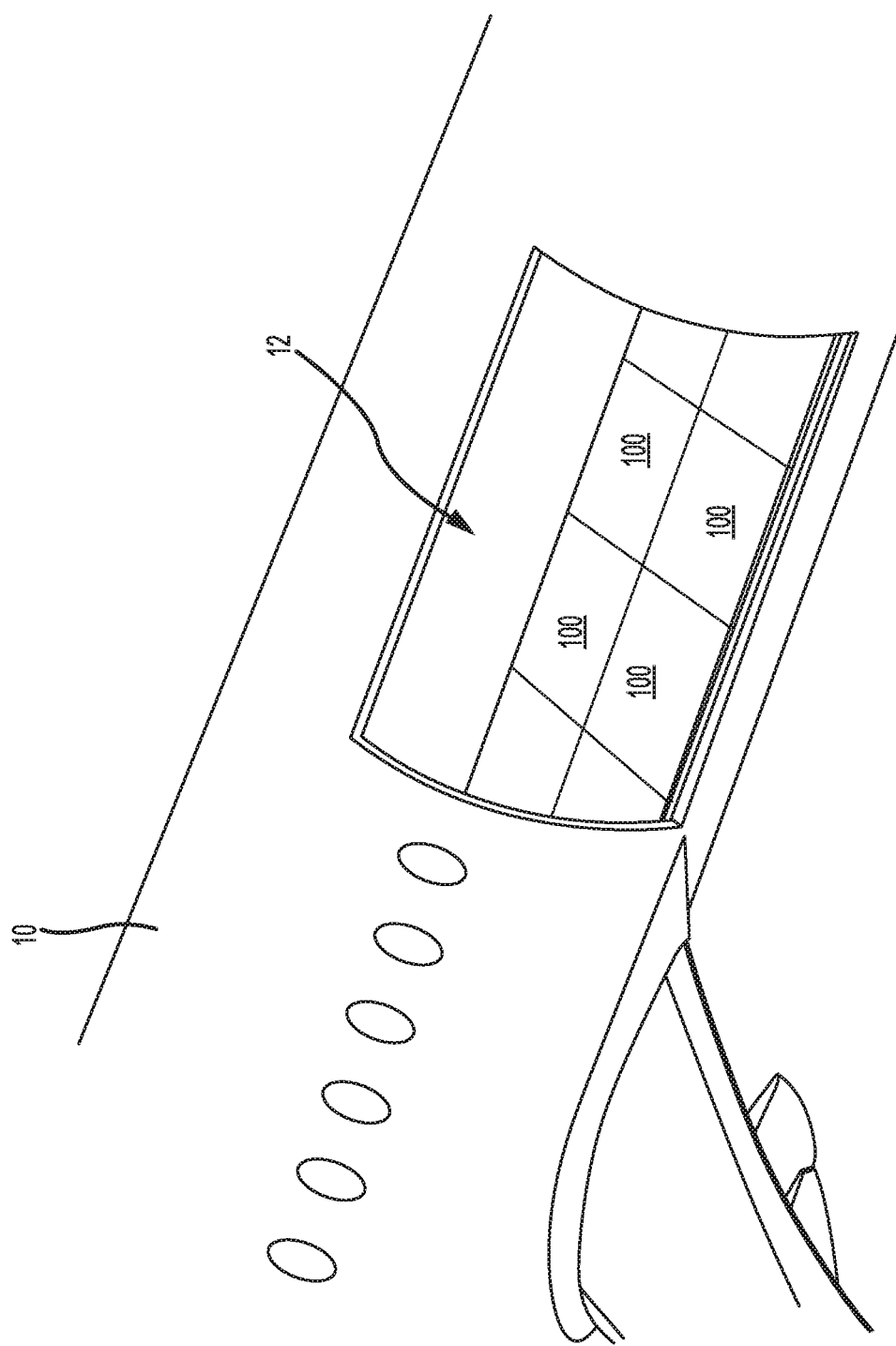
FIG. 1 illustrates a perspective view of an aircraft having heated floor panels, in accordance with various embodiments.
Figure 2A:
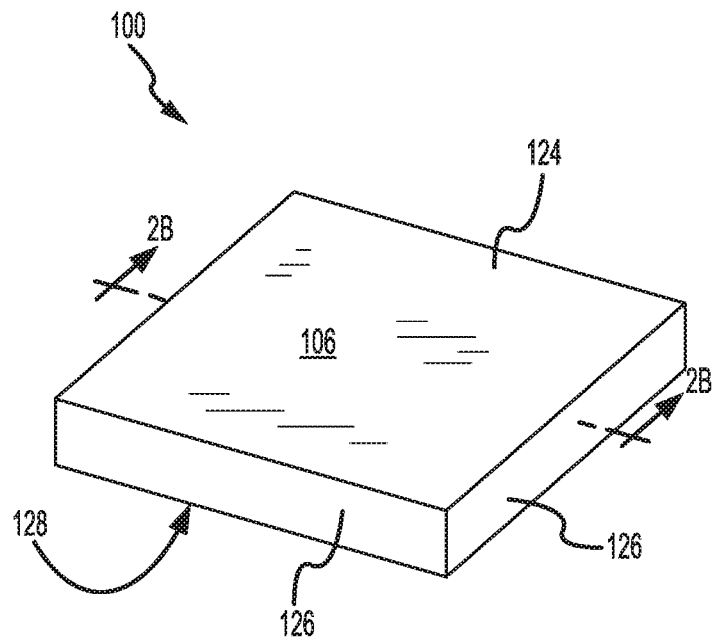
FIG. 2A illustrates a perspective view of a heated floor panel, in accordance with various embodiments.
Figure 2B:
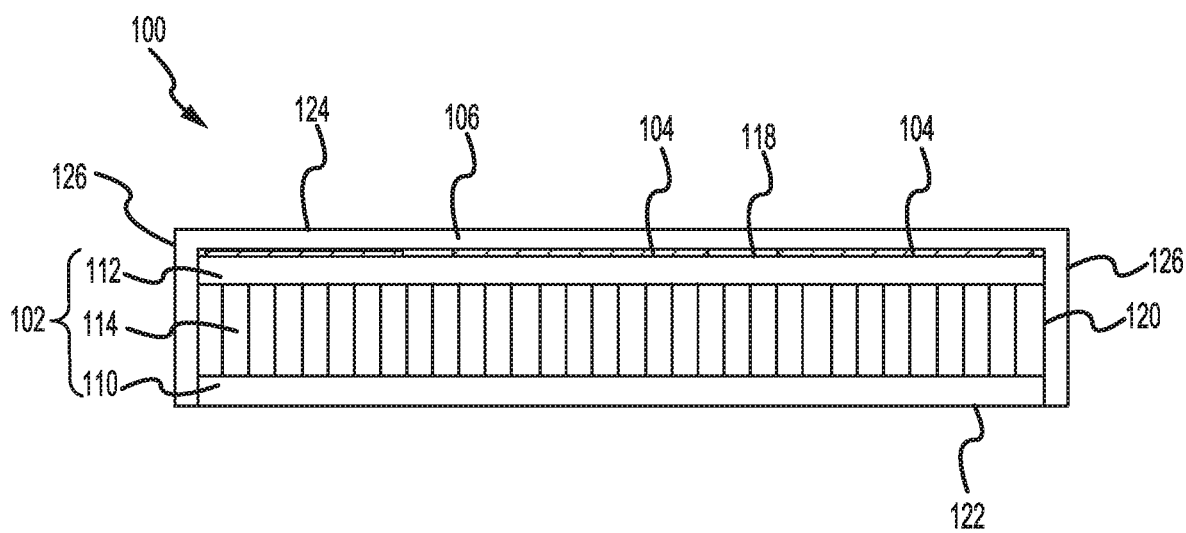
FIG. 2B illustrates a cross-section view of a heated floor panel, taken along the line 2B-2B in FIG. 2A, in accordance with various embodiments

With reference to FIG. 1, an aircraft 10 having heated floor panels 100 is illustrated. Heated floor panels may be mounted throughout an interior 12 or aircraft 10. Referring to FIGS. 2A and 2B, a heated floor panel 100 is illustrated. In accordance with various embodiments, heated floor panel 100 includes a base assembly 102, one or more heating elements 104, and a panel skin 106. In accordance with various embodiments, heating elements 104 may be sandwiched (i.e., located between base assembly 102 and panel skin 106). In various embodiments, base assembly 102 includes a bottom (or first) layer 110, a top (or second) layer 112, and a honeycomb layer 114 between bottom layer 110 and top layer 112. Bottom and top layers 110, 112 may structurally support heated floor panel 100. In various embodiments, bottom and top layers 110, 112 comprise a fiber reinforced composite material, such as, for example, a carbon reinforced polymer, a fiberglass reinforced polymer, or similar fiber reinforced composite material. Bottom and top layers 110, 112 may also comprise plastic, ceramic, or any other desired material.

In various embodiments, heating elements 104 may be located on a top surface 118 of base assembly 102. In various embodiments, heating elements 104 may be bonded to base assembly 102. In various embodiments, heating elements 104 may be located in other locations of base assembly 102, for example, between honeycomb layer 114 and top layer 112. Top surface 118 may be formed by top layer 112. Panel skin 106 is located over heating elements 104. In accordance with various embodiments, panel skin 106 is configured to extend over (i.e., cover) top surface 118 and sidewalls 120 of base assembly 102. Panel skin 106 may extend over sidewalls 120 to a bottom surface 122 of base assembly 102. Sidewalls 120 may extend from top surface 118 to bottom surface 122 of base assembly 102. Bottom surface 122 of base assembly 102 is formed by bottom layer 110 and is opposite top surface 118. Sidewalls 120 may be formed by bottom layer 110, top layer 112, and honeycomb layer 114. In accordance with various embodiments, panel skin 106 may surround an outer perimeter of bottom layer 110, top layer 112, and honeycomb layer 114.

Panel skin 106 may comprise metal, metal alloy, polymer, or composite material (e.g., a fiber reinforced composite). In various embodiments, panel skin may be formed of aramid fiber, such as that sold under the mark KEVLAR®. Panel skin 106 may protect base assembly 102 and heating elements 104. In various embodiments, panel skin 106 may be configured to spread and/or distribute the heat generated by heating elements 104 across an upper (or first) surface 124 of heated floor panel 100. Upper surface 124 of heated floor panel 100 is formed by panel skin 106. Upper surface 124 of panel skin is opposite bottom surface 122 of base assembly 102. Panel skin 106 may form upper surface 124 and perimeter surfaces 126 of heated floor panel 100. An underside (or second) surface 128 of heated floor panel may be formed by panel skin 106 and bottom surface 122 of base assembly 102.

Figure 3A:
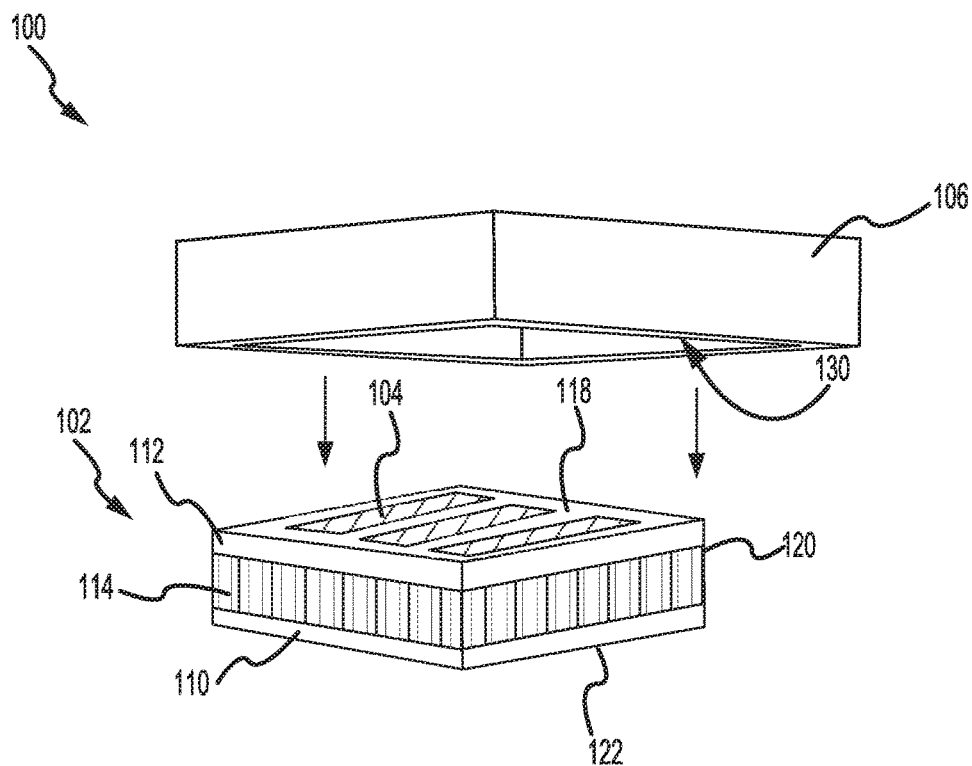
FIGS. 3A and 3B illustrate a perspective view and a cross-section assembly view, respectively, of a heated floor panel, in accordance with various embodiments.
Figure 3B:
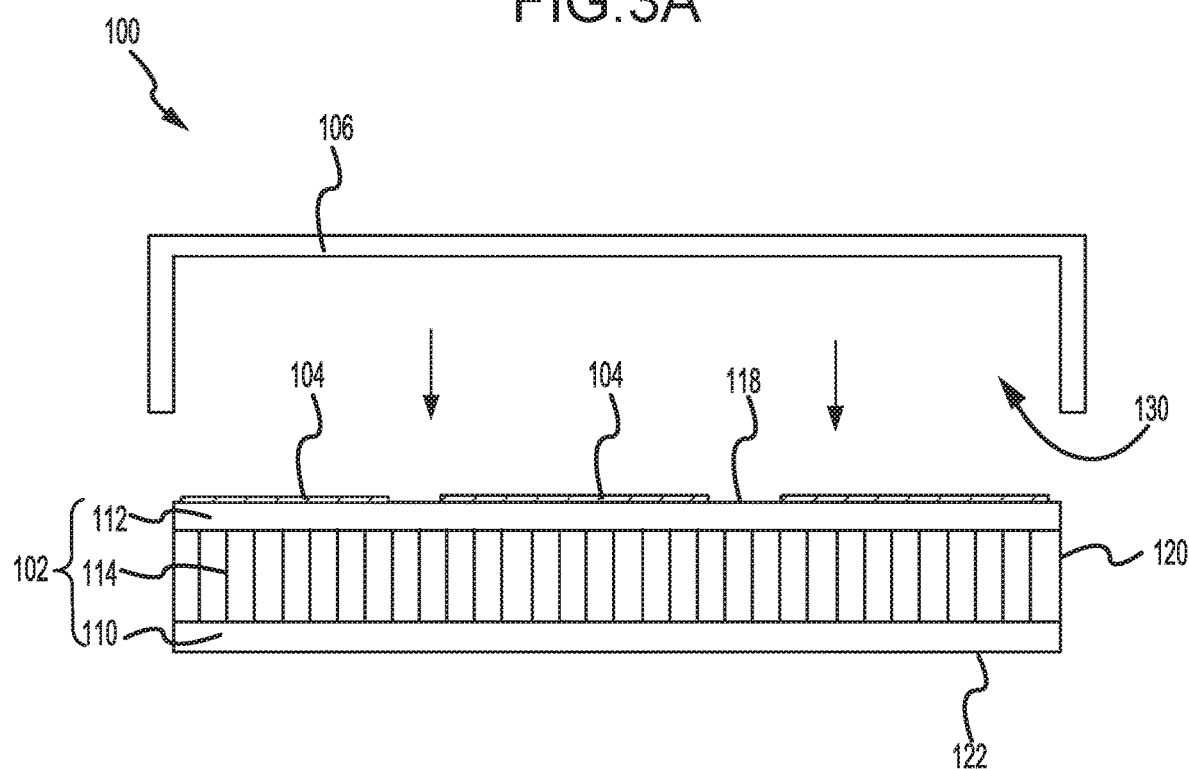

With reference to FIGS. 3A and 3B, assembly of heated floor panel 100 is illustrated. In accordance with various embodiments, panel skin 106 is located over assembled base assembly 102 with heating elements 104 located thereon. In various embodiments, base assembly 102 may be cured (i.e., the bonding together of bottom layer 110, a top layer 112, and honeycomb layer 114 is performed) prior to locating panel skin 106 over base assembly 102. Base assembly 102 may also be cured after to locating panel skin 106 over base assembly 102.

In accordance with various embodiments, panel skin 106 is pre-formed to a shape that complements the shape of base assembly 102. For example, panel skin 106 may be formed by stamping, molding, casting, 3-D printing, or other suitable method. In accordance with various embodiments, panel skin 106 may be cured prior to locating panel skin 106 over base assembly 102. Panel skin 106 is formed to include a cavity 130 configured to receive base assembly 102. In this regard, cavity 130 includes a height, a width, a length, and a shape that matches the height, width, length, and shape of base assembly 102. In accordance with various embodiments, panel skin 106 is configured to surround the sidewalls 120 of base assembly 102. In various embodiments, panel skin 106 comprises a unibody or monolithic structure. In this regard, the structures (e.g., walls, top surface, etc.) of panel skin 106 may be integral to one another rather than bonded together.

In various embodiments, panel skin 106 may be bonded to base assembly 102 using an adhesive, for example, using an epoxy resin, phenolic resin, vinyl acetate, acrylic pressure sensitive, or other suitable adhesive. In various embodiments, the adhesive may be in the form of a thermoset adhesive, such as, for example, a phenolic surface film. In various embodiments, panel skin 106 may be bonded directly to and/or located directly adjacent to the sidewalls 120 and outer perimeter of honeycomb layer 114 of base assembly 102. In this regard, base assembly 102 may be free from fillers or other materials located around the outer perimeter of honeycomb layer 114. Heating elements 104 may be bonded to base assembly 102 prior to attaching panel skin 106. Stated differently, in various embodiments, panel skin 106 may be bonded to a base assembly 102 including heating elements 104.

Figure 4B:
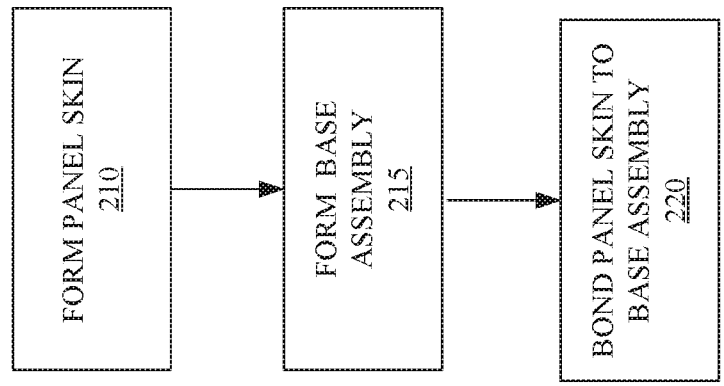
FIGS. 4A and 4B illustrate a method of forming a heated floor panel, in accordance with various embodiments.
Figure 4A:
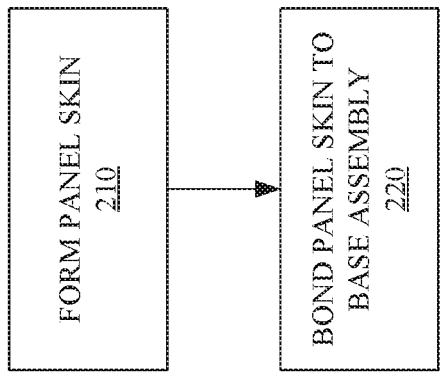

With reference to FIG. 4A, and continued reference to FIG. 3B, a method 200 of forming a heated floor panel is illustrated. Method 200 may include forming a panel skin (step 210) and bonding the panel skin to a base assembly (step 220). Step 210 may include forming panel skin 106 including cavity 130. Step 220 may include locating base assembly 102 within cavity 130. In various embodiments, step 210 may include forming panel skin 106 using at least one of stamping, 3-D printing, or molding. In various embodiments, method 200 may include curing panel skin 106 prior to step 220. In various embodiments, step 210 may include using an adhesive to bond the panel skin 106 to the base assembly 102.

With reference to FIG. 4B, and continued reference to FIG. 3B, in various embodiments, method 200 may include forming the base assembly (step 215). Step 215 may include bonding honeycomb layer 114 between top layer 112 and bottom layer 110. In various embodiments, top layer 112 may include heating elements 104. In various embodiments, step 215 may include attaching heating elements 104 to top layer 112. In various embodiments, step 215 may include curing the base assembly 102 prior to step 220. Base assembly 102 may also be cured after being located within cavity 130 (e.g., during step 220). For example, in various embodiments, step 215 may include stacking honeycomb layer 114 between top layer 112 and bottom layer 110 and step 220 may include placing the uncured base assembly 102 into cavity 130 and heating the panel skin 106 with the uncured base assembly 102 located in cavity 130 to both cure the base assembly 102 and bond the panel skin 106 to the base assembly 102.

In various embodiments, step 215 may include stacking top layer 112, honeycomb layer 114, and bottom layer 110 individually in cavity 130. For example, in various embodiments, top layer 112, including heating elements 104, is first located in cavity 130, then honeycomb layer 114 is placed in cavity 130 over top layer 112, and then bottom layer 110 is placed in cavity 130 over honeycomb layer 114. After top layer 112, honeycomb layer 114, and bottom layer 110 are located within cavity 130, the panel skin 106 and the base assembly 102 are heated to cure base assembly 102 and bond base assembly 102 to panel skin 106. In this regard, in various embodiments, step 220 may include simultaneously, or near simultaneously, curing the base assembly 102 and bonding the base assembly 102 to the panel skin 106.

Bonding pre-formed panel skin 106 to base assembly 102 may decrease the number of steps associated with forming heated floor panel 100, which tends to reduce manufacturing time and cost. Locating panel skin 106 around the sidewalls 120 of base assembly 102 may eliminate the need for fillers or other materials around the edges of base assembly 102. Eliminating fillers may reduce a weight of heated floor panel 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A heated floor panel, comprising:
   a heating element;
   a panel skin located over the heating element; and
   a base assembly comprising a top layer and a bottom layer and located in a cavity defined by the panel skin, wherein the top layer comprises a first surface and a second surface and wherein the bottom layer comprises a first surface and a second surface,
   wherein the base assembly further includes a honeycomb layer located between the top layer and the bottom layer and in contact with the second surface of the top layer and the first surface of the bottom layer,
   wherein the heating element is located between the top layer of the base assembly and the honeycomb layer,
   wherein the base assembly includes a plurality of sidewalls extending between the first surface of the top layer and the second surface of the bottom layer,
   wherein the panel skin is located over the first surface of the top layer of the base assembly, and
   wherein the panel skin extends from the first surface of the top layer of the base assembly to the first surface of the bottom layer of the base assembly covering each of the plurality of sidewalls.

2. The heated floor panel of claim 1, wherein the panel skin surrounds an outer perimeter of the honeycomb layer.

3. The heated floor panel of claim 1, wherein the top layer and the bottom layer of the base assembly each comprise a fiber reinforced composite material.

4. The heated floor panel of claim 3, wherein the panel skin comprises a metal, a metal alloy, a polymer, or the fiber reinforced composite material.

5. The heated floor panel claim 3, wherein the panel skin comprises an aramid fiber.

6. A heated floor panel, comprising:
   a heating element;
   a panel skin located over the heating element; and
   a base assembly comprising a top layer and a bottom layer and located in a cavity defined by the panel skin, wherein the top layer comprises a first surface and a second surface and wherein the bottom layer comprises a first surface and a second surface, wherein the base assembly further includes a honeycomb layer located between the top layer and the bottom layer and in contact with the second surface of the top layer and the first surface of the bottom layer, and a plurality of sidewalls extending between the first surface of the top layer and the second surface of the bottom layer;

wherein the heating element is located between the top layer of the base assembly and the honeycomb layer, wherein the panel skin is located over the first surface of the top layer of the base assembly, wherein the panel skin extends from the first surface of the top layer of the base assembly to the second surface of the bottom layer of the base assembly, and wherein the panel skin is configured to extend over the top layer, the bottom layer, and each of the plurality of sidewalls extending between the first surface of the top layer and the second surface of the bottom layer of the base assembly.

7. The heated floor panel of claim 6, wherein the panel skin is directly adjacent to an outer perimeter of the honeycomb layer.

8. The heated floor panel of claim 6, wherein the top layer and the bottom layer of the base assembly comprise a fiber reinforced composite material.

9. The heated floor panel of claim 6 wherein the panel skin comprises at least one of a metal, a metal alloy, a polymer, a fiber reinforced composite material, and a panel skin may comprise an aramid fiber.

\* \* \* \* \*